United States Patent [19]

Miranti, Jr. et al.

[11] Patent Number: 4,509,933
[45] Date of Patent: Apr. 9, 1985

[54] BELT PULLEY AND METHOD OF MAKING THE SAME

[75] Inventors: Joseph P. Miranti, Jr., Porter Township, Christian County; James K. Brew, Greene County, both of Mo.

[73] Assignee: Dayco Corporation, Dayton, Ohio

[21] Appl. No.: 383,845

[22] Filed: Jun. 1, 1982

[51] Int. Cl.³ .............................................. F16H 57/04
[52] U.S. Cl. ....................................... 474/93; 474/188
[58] Field of Search ......................... 474/168, 188, 93; 188/264 A, 264 AA; 192/113 A, 113 R

[56] References Cited

U.S. PATENT DOCUMENTS

| 1,372,700 | 3/1921 | Kimble | 474/93 |
| 1,388,865 | 8/1921 | Kimble | 474/93 |
| 1,433,828 | 10/1922 | Kimble | 474/93 |
| 1,443,541 | 1/1923 | Kimble | 474/93 |
| 2,391,642 | 12/1945 | Reed | 474/188 X |
| 3,006,382 | 10/1961 | Broome | 474/168 X |

FOREIGN PATENT DOCUMENTS

| 671990 | 5/1952 | United Kingdom . |
| 844385 | 8/1960 | United Kingdom . |
| 865797 | 4/1961 | United Kingdom . |
| 891375 | 3/1962 | United Kingdom . |
| 911659 | 11/1962 | United Kingdom . |
| 1338568 | 11/1973 | United Kingdom . |
| 1501408 | 2/1978 | United Kingdom . |

Primary Examiner—Lawrence J. Staab
Assistant Examiner—Dwight G. Diehl
Attorney, Agent, or Firm—Joseph V. Tassone

[57] ABSTRACT

A belt pulley and method of making the same are provided, the pulley having a hub and a peripheral groove for receiving part of an endless belt therein that is to drive the pulley or be driven thereby whereby the pulley is adapted to be rotated about the axis of the hub. The groove of the pulley defines an annular bottom surface of the groove and a pair of spaced apart angled inside surfaces of the groove that join with the bottom surface and diverge away from each other as the angled surfaces extend away from the bottom surface. The angled surfaces are adapted to be engaged by opposed angled sides of the belt in such a manner that a bottom of the belt will be spaced from the bottom surface. The pulley has opposed outer sides. The pulley has at least one passage provided with an inlet interrupting one of the opposed outer sides adjacent the hub and an outlet interrupting the bottom surface of the peripheral groove whereby fluid passing through the passage from the inlet to the outlet thereof will tend to cool the pulley and the belt as the pulley rotates about its axis, the passage comprises a straight bore connecting the inlet and outlet and having a centerline, the bore being arranged such that upon extension of the centerline through the outlet it will intersect one of the angled surfaces in close proximity to the bottom surface.

10 Claims, 12 Drawing Figures

BELT PULLEY AND METHOD OF MAKING THE SAME

BACKGROUND OF THE INVENTION

1. Field of the Invention

This invention relates to an improved belt pulley and to a method of making such a belt pulley or the like.

2. Prior Art Statement

It is known in the art to provide a belt pulley having a hub and a peripheral groove for receiving part of an endless belt therein that is to drive the pulley or be dirven thereby whereby the pulley is adapted to be rotated about the axis of the hub, the pulley having a plurality of radially disposed fins extending outwardly from at least one side thereof. However, it is believed that no cover plate covers such fins so as to provide closed passages between the fins except at the inlets and outlets thereof.

However, it is known in the disc brake art to provide in the disc brake rotor a plurality of radially disposed passage means each provided with an inlet adjacent the hub of the brake rotor and an outlet adjacent the outer periphery of the brake rotor whereby fluid passing through the passages from the inlets thereof to the outlets thereof will tend to cool the brake rotor as the brake rotor rotates about the axis of the hub thereof, the passage means each being defined between a pair of radially disposed vanes.

It is also known to provide a belt pulley having a hub and a peripheral groove for receiving part of an endless belt therein that is to drive the pulley or be driven thereby whereby the pulley is adapted to be rotated about the axis of the hub, the groove of the pulley defining an annular bottom surface of the groove and a pair of spaced apart angled inside surfaces of the groove that join with the bottom surface and diverge away from each other as the angled surfaces extend away from the bottom surface. The angled surfaces are adapted to be engaged by opposed angled sides of the belt in such a manner that the bottom of the belt will be spaced from the bottom surface. The pulley has opposed outer sides. The pulley has means defining at least one passage means provided with an inlet interrupting one of the opposed outer sides adjacent the hub and an outlet interrupting the bottom surface of the peripheral groove whereby fluid passing through the passage means from the inlet to the outlet thereof will tend to cool the pulley and the belt as the pulley rotates about its axis. For example, see British Pat. No. 865,797.

SUMMARY OF THE INVENTION

It is one feature of this invention to provide an improved belt pulley having improved means for cooling the same.

In particular, it is known that belt life, particularly in high ratio or high load drives (including vehicle drives such as continuously variable transmissions and automotive accessory drives as well as industrial type drives) is limited largely by belt operating temperature.

Accordingly, it was found according to the teachings of this invention that the operating temperature of a belt being utilized with a ventilated pulley of this invention is reduced if the pulley has at least one passage means provided with an inlet adjacent the hub of the pulley and an outlet adjacent the peripheral groove of the pulley whereby fluid passing through the passage means from the inlet thereof to the outlet thereof will cool the pulley and/or the belt as the pulley rotates about the axis of the hub thereof and thereby increases the life of the belt.

For example, one embodiment of this invention provides a belt pulley having a hub and a peripheral groove for receiving part of an endless belt therein that is to drive the pulley or be driven thereby whereby the pulley is adapted to be rotated about the axis of the hub. The groove of the pulley defines an annular bottom surface of the groove and a pair of spaced apart angled inside surfaces of the groove that join with the bottom surface and diverge away from each other as the angled surfaces extend away from the bottom surface. The angled surfaces are adapted to be engaged by opposed angled sides of the belt in such a manner that a bottom of the belt will be spaced from the bottom surface. The pulley has opposed outer sides. The pulley has means defining at least one passage means provided with an inlet interrupting one of the opposed outer sides adjacent the hub and an outlet interrupting the bottom surface oo the peripheral groove whereby fluid passing through the passage means from the inlet to the outlet thereof will tend to cool the pulley and the belt as the pulley rotates about the axis of the hub, the means defining the passage means defining the passage means so that a substantially straight line extending from a centerline of the passage means that passes from the inlet to the outlet thereof will engage against one of the angled surfaces without engaging against the bottom of the belt.

Accordingly, it is an object of this invention to provide an improved belt pulley having one or more of the novel features of this invention as set forth above or hereinafter shown or described.

Another object of this invention is to provide an improved method of making such a belt pulley, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
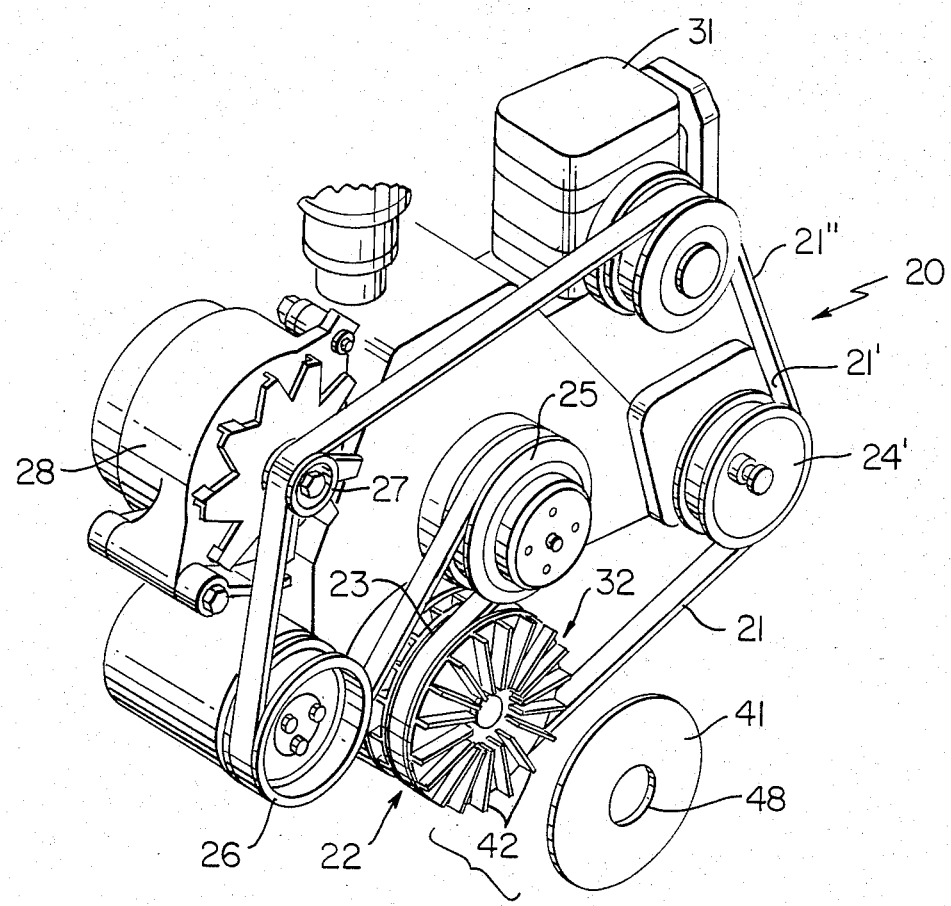
FIG. 1 is a fragmentary, isometric view looking toward the front end of an automotive engine which is adapted to utilize any one of the pulleys of this invention, FIG. 1 illustrating one of the pulleys of this invention and having a part thereof exploded therefrom.

While the various features of this invention are hereinafter illustrated and described as providing a belt pulley of a particular motor vehicle engine, it is to be understood that the various features of this invention can be utilized singly or in any combination thereof to provide a belt pulley for other belt systems as desired.

Therefore, this invention is not to be limited to only the embodiments illustrated in the drawings, because the drawings are merely utilized to illustrate one of the wide variety of uses of this invention.

Figure 2:
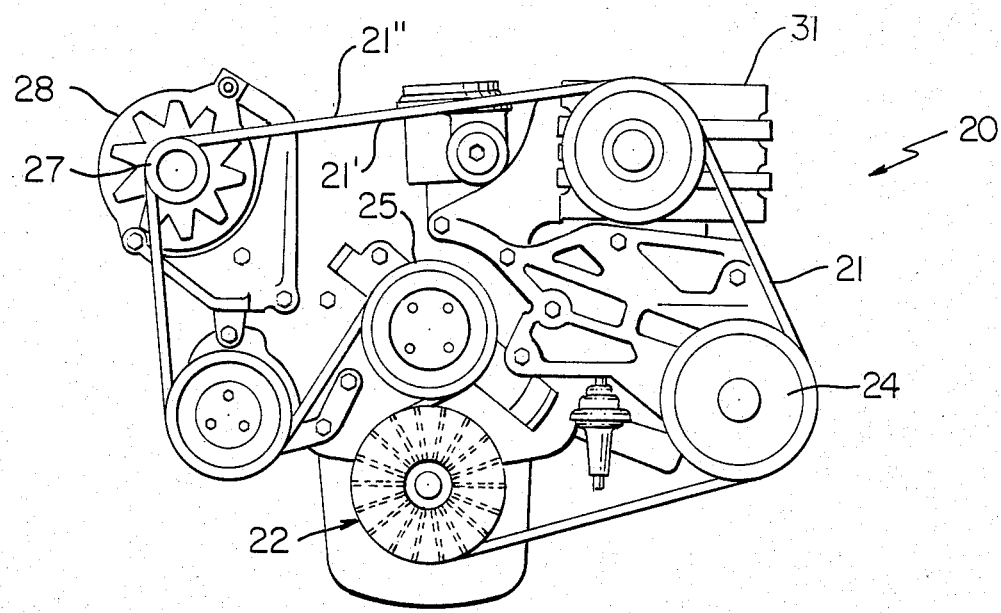
FIG. 2 is a view looking perpendicularly toward the front end of an automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved pulley of this invention being generally indicated by the reference numeral 22 in FIGS. 3–5 and being adapted to be utilized to provide a cooling effect on the belt 21 in a manner hereinafter set forth.

The endless power transmission belt 21 may be of any suitable type known in the art and is preferably made primarily of a polymeric material. The belt 21 in FIGS. 1 and 2 is of a generally rectangular cross-sectional configuration and has a bottom driving surface 21' and a top driving surface 21" in a manner well known in the art, the belt 21 being ribbed or non-ribbed as desired.

However, it is to be understood that the various features of this invention as hereinafter set forth are adapted to operate on belt constructions having other cross-sectional configurations whereby the various embodiments of the pulleys of this invention illustrated in FIGS. 3–12 are illustrated as providing pulleys for belts that have a generally trapezoidal cross-sectional configuration as is well known for V-belt constructions with the understanding that the various pulleys of this invention can be modified in a manner well known in the art to operate on belts of other cross-sectional configurations as desired.

The belt 21 is driven by a pulley portion 23 of the pulley 22 of this invention which is operatively interconnected to the crankshaft of the engine 20 in a manner well known in the art whereby the pulley 22 is a driven sheave or pulley. The driving pulley 22 drives the belt 21 in an endless path and thereby drives a sheave or pulley 24 of a power steering device used in an automobile (not shown) utilizing the engine 20, a sheave or pulley 25 of an engine water pump, a sheave or pulley 26 of an air pump of a type used in an antipollution system for the engine 20, a sheave or pulley 27 of an engine electrical alternator 28 and a sheave or pulley 30 of a compressor 31 of an airconditioning system for the automobile utilizing the engine 20. All of the driven accessories, through their sheaves or pulleys 24, 25, 26, 27 and 30 impose a load on the belt 21 as is well known in the art whereby the same impose a heating load to the belt 21, the driving pulley 22 and engine 20 also imposing a heating load to the belt 21 as is well known in the art.

As previously stated, it is one feature of this invention to provide the pulley 22 with means that tend to cool the belt 21 during its operation.

In particular, the pulley 22 as illustrated in FIGS. 1–5 comprises a conventional pulley portion 23 and a ventilating device of this invention that is generally indicated by the reference numeral 32 in the drawings and having a plurality of passage means passing therethrough, each passage means being generally indicated by the reference numeral 33.

Figure 3:
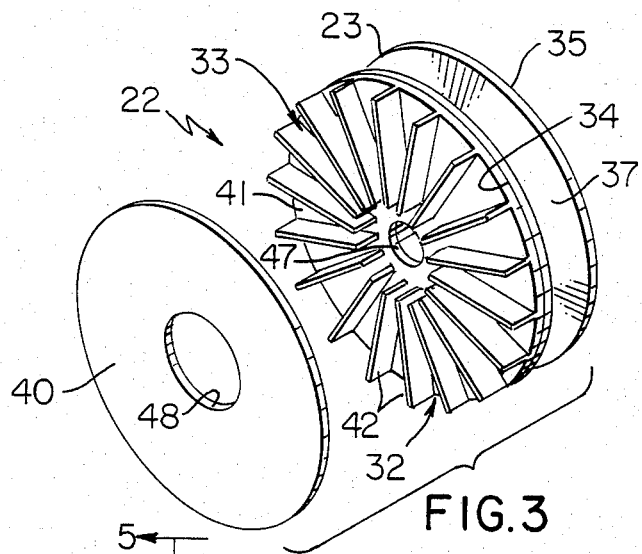
FIG. 3 is an enlarged, exploded perspective view of the belt pulley of this invention that is utilized in FIGS. 1 and 2.
Figure 4:
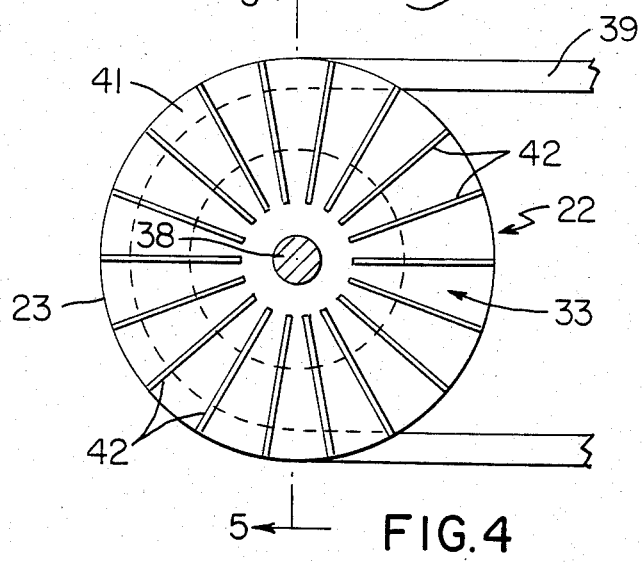
FIG. 4 is a cross-sectional view taken on line 4—4 of FIG. 5 and illustrates the belt pulley of FIGS. 1-3.
Figure 5:
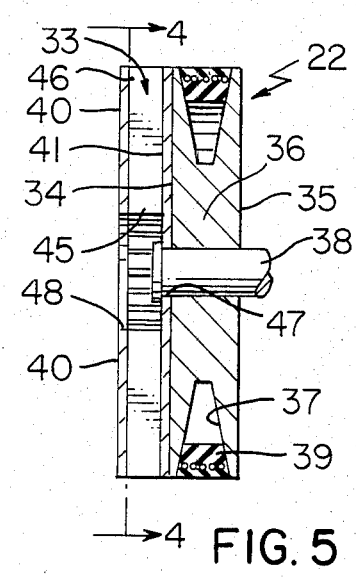
FIG. 5 is a cross-sectional view taken on line 5—5 of FIG. 4.

The pulley portion 23 has opposed substantially parallel flat sides 34 and 35 and is provided with a hub 36 and a peripheral groove 37, the hub 36 being adapted to be secured to a suitable drive or driven shaft 38 in a manner well known in the art while the peripheral groove 37 is adapted to receive part of an endless transmission belt therein in a manner well known in the art which comprises the belt 21 in FIGS. 1 and 2 and a V-belt 39 in FIGS. 3–5.

The ventilating device 32 of this invention comprises a pair of substantially flat disk-like plates 40 and 41 secured together with a plurality of substantially flat and radially extending vanes 42 disposed therebetween and cooperating with the inner sides 43 and 44 of the plates 40 and 41 to define the plurality of radially disposed passages 33 with each passage 33 being disposed between an adjacent pair of vanes 42 and having an inlet 45 adapted to be disposed adjacent the hub 36 of the pulley 22 and an outlet 46 adapted to be disposed adjacent the peripheral groove 37 of the pulley 22 when the plate 41 of the ventilating device 32 is secured against the side 34 of the pulley portion 23 in the manner illustrated in FIGS. 3–5.

The plate 41 has a central opening 47 passing therethrough of a size and configuration to permit the same to be secured to the drive or driven shaft 38 while the plate 40 has a larger central opening 48 passing therethrough to provide an enlarged passage or opening leading to the inlets 45 of the passages 33 as illustrated in the drawings.

While the pulley portion 23 and ventilating device 32 can be formed of any suitable material, it is believed that the same should be formed of material having a high coefficient of heat conductivity, such as metallic material, in order to optimize the amount of cooling from the air flowing through the passages 33.

In particular, as the pulley 22 is being rotated by the belt 39 or is being rotated by the shaft 38 as the case may be, it is believed that a centrifugal force is created through the rotation of the pulley 22 which will force an air flow through the passages 33 thereof from the inlets 45 thereof to the outlets 46 thereof and thereby in much the same manner as a Venturi arrangement will cause fresh air to continuously flow into the inlets 45 of the passages 33 whereby the constant flow of air through the opening 48 of the plate 40 and through the passages 33 will through conduction cool the pulley 22 and, thus, cool the belt 39 so that the pulley 22 provides a cooling effect on the belt 39 in the operation of the system utilizing the pulley 22 and belt 39, such as the system illustrated in FIGS. 1 and 2.

While the vanes 42 could be formed separate from the plates 40 and 41 and be secured thereto in any suitable manner, the pulley 22 is illustrated in FIGS. 3–5 as having the vanes 42 formed integrally in a one-piece manner with the plate 41 while the plate 40 is subsequently secured to the vanes 42 as illustrated.

However, it is to be understood that other arrangements can be utilized to provide for the air flow passages 33.

Figure 6:
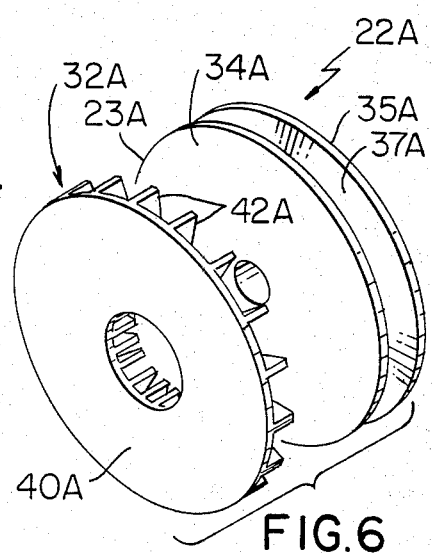
FIG. 6 is an exploded perspective view similar to FIG. 3 and illustrates another embodiment of the belt pulley of this invention.

For example, reference is now made to FIG. 6 wherein another pulley of this invention is generally indicated by the reference numeral 22A and parts thereof similar to the pulley 22 previously described are indicated by like reference numerals followed by the reference letter "A".

As illustrated in FIG. 6, the pulley 22A comprises the standard pulley portion 23A and a ventilating means 32A of this invention which comprises the plate 40A having the vanes 42A integral therewith and being adapted to be secured directly to the side 34A of the pulley 23 without having the intervening plate 41 of the ventilating means 32 previously described.

If desired, the side 34 of the pulley 23 could have the vanes 42 integral therewith.

Figure 7:
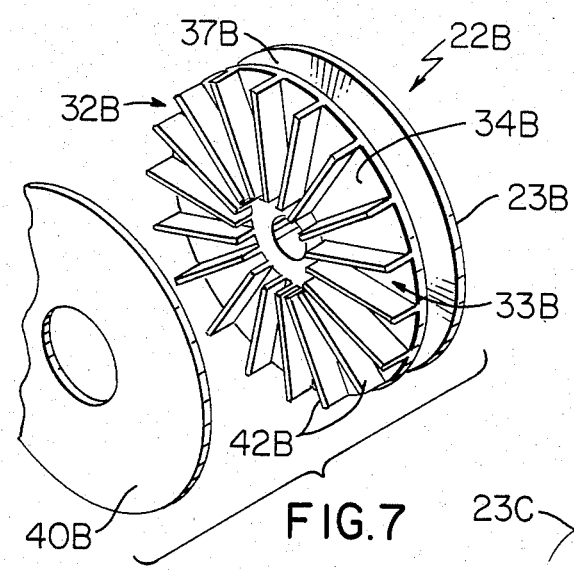
FIG. 7 is an exploded perspective view similar to FIG. 3 and illustrates another embodiment of the belt pulley of this invention.

In particular, reference is now made to FIG. 7 wherein another pulley of this invention is generally indicated by the reference numeral 22B and parts thereof similar to the pulleys 22 and 22A previously described are indicated by like reference numerals followed by the reference letter "B".

As illustrated in FIG. 7 it can be seen that the pulley portion 23B has the plurality of vanes 42B integrally formed on the side 34B thereof and that the plate 40B is adapted to be secured directly to the vanes 42B to form the passages 33B to function in the manner previously described for the passages 33 of the pulley 22.

While the various pulleys 22, 22A and 22B each has a single peripheral groove 37, 37A and 37B therein, it is to be understood that the various pulleys of this invention can have more than one belt receiving peripheral groove and more than one ventilating means.

Figure 8:
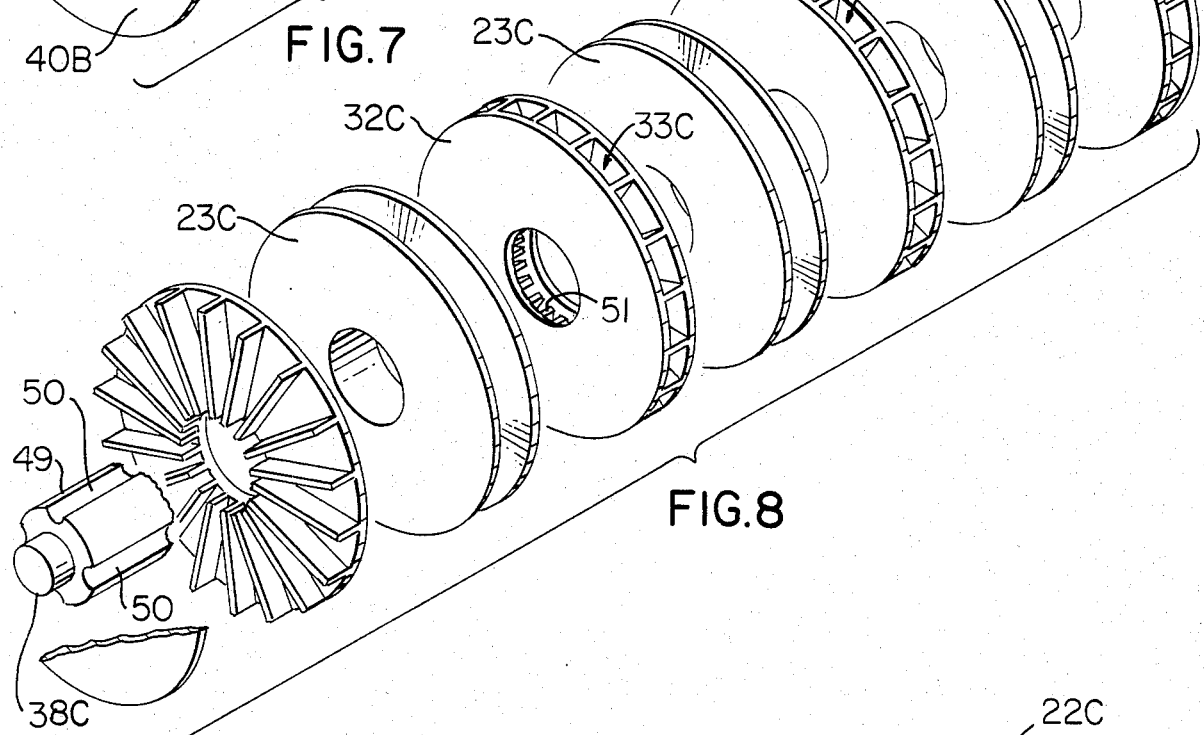
FIG. 8 is an exploded perspective view illustrating another belt pulley of this invention.
Figure 9:
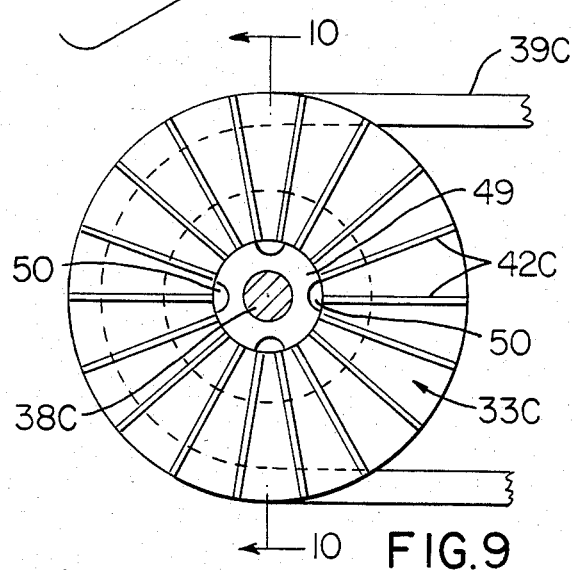
FIG. 9 is an end view of FIG. 10 and comprises the belt pulley of FIG. 8.
Figure 10:
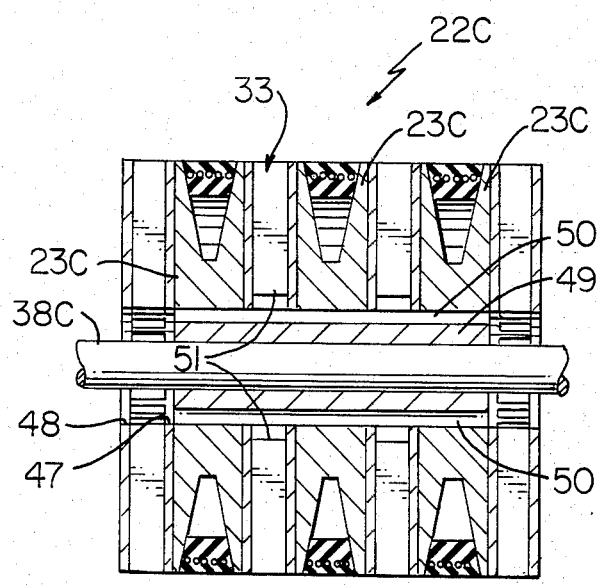
FIG. 10 is a cross-sectional view taken on line 10—10 of FIG. 9.

For example, reference is now made to FIGS. 8–10 wherein another pulley of this invention is generally indicated by reference numeral 22C and parts thereof similar to pulleys 22, 22A and 22B previously described are indicated by like reference numerals followed by the reference letter "C".

As illustrated in FIGS. 8–10, the pulley 22C includes a plurality of pulley portions 23C disposed in axial aligned relation and having a plurality of ventilating means 32C of this invention arranged and secured therewith in an alternating manner so that a ventilating unit 32C is disposed outboard of the pulley portions 23C at each end of the arrangement while a ventilating means 32C is disposed between each adjacent pair of pulley portions 23C as illustrated.

Additionally, a hub member 49 is disposed in and secured to the pulley portions 23C and is adapted to be splined or otherwise fixed to the drive or driven shaft 38C in any suitable manner, the hub member 49 having a plurality of grooves 50 formed longitudinally along the same and each being adapted to be disposed in fluid communication with the venting devices 32C that are disposed intermediate the pulley portions 23C. In fact, the vanes 42C of the intermediate venting devices 32C of the pulley 22C can have the inner ends 51 thereof spaced from the hub 49 so that the grooves 50 will be in full communication with all of the passages 33C of the devices 32C that are disposed intermediate the pulleys 23C as illustrated, the outboard ventilating devices 32C having the openings 47C and 48C thereof at least as large as the outer diameter of the hub 49 to assure that the passages 50 thereof will be in fluid communication with air outboard of the pulley 22C so as to be drawn therein by the aforementioned centrifical action of the pulley 22C.

While the various pulleys of this invention as previously described each has the passage means 33, 33A, 33B and 33C thereof formed by a plurality of vanes, it is to be understood that the various passage means could be formed by other structures as desired.

Figure 11:
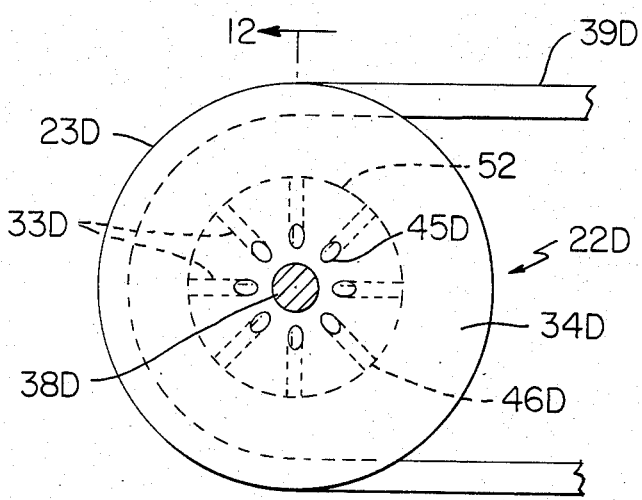
FIG. 11 is a view similar to FIG. 9 and illustrates another belt pulley of this invention.
Figure 12:
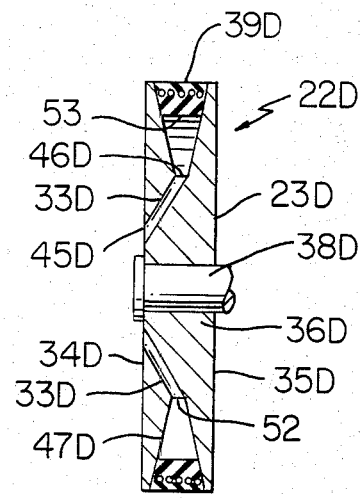
FIG. 12 is a cross-sectional view taken on line 12—12 of FIG. 11.

For example, reference is now made to FIGS. 11 and 12 wherein another pulley of this invention is generally indicated by the reference numeral 22D and parts thereof similar to the other pulleys 22, 22A, 22B and 22C are indicated by like reference numerals followed by the reference letter "D".

As illustrated in FIGS. 11 and 12, the pulley 22D comprises a conventional pulley portion 23D having a hub portion 36D adapted to be secured to a driven or driving shaft 38D in any suitable manner and has an outer peripheral groove 37D for receiving part of an endless belt 39D therein, the pulley portion 23D having substantially parallel opposed sides 34D and 35D as previously set forth.

However, the pulley portion 23D is provided with a plurality of passages 33D that can be formed by drilling into the side wall 34D of the pulley 23D adjacent the hub 36D thereof at an angle so that the same will intersect with the bottom annular surface 52 of the pulley portion 23D that defines the bottom of the peripheral groove 37D thereof.

In this manner, each passage 33D has an inlet 45D disposed adjacent the hub 36D of the pulley portion 23D and an outlet 46D disposed adjacent the peripheral groove 37D thereof, the passages 33D being substantially radially disposed in the pulley 23D and being substantially straight between the inlets 45D thereof and the outlets 46D thereof as well as being substantially equally spaced in a circumferential manner about the pulley portion 23D in substantially the same manner that the passages 33 are disposed equally spaced in a circumferential manner about the pulley 22 previously described.

The passages 33D of the pulley 22D operate in substantially the same manner as previously described for directing a flow of air therethrough to cool the pulley 22D and, thus, the belt 39D during rotation of the pulley 22D by the aforementioned centrifugal action but additionally such air exiting the outlets 46D of the passages 33D will directly flow against the bottom surface 53 of the belt 39D to additionally cool the same in combination with the conduction cooling thereof caused by the air flow through the passages 33D.

Therefore, it can be seen that the pulley 22D, in effect, is a vented hub arrangement whereas in the pulleys 22, 22A, 22B and 22C, the same are, in effect, vented sidewall arrangements. Nevertheless, in both situations, air flow is created by centrifugal acceleration of a boundary layer due to rotation and augmented by a Venturi effect as the passages are swept through the air faster at the outer outlets than their inner inlets which are near the respective hubs.

In the case of the vented hub 36D of the pulley 22D, air flow cools the base of the belt and inhibits heat transfer through the base of the pulley 22D from the shaft 38D. Also, it can be seen that in the pulley 22D, the air flow into the peripheral groove 37D cools either or both pulley faces 34D and 35D and the belt 39D is additionally cooled by conduction.

While the pulleys 22, 22A, 22B and 22D have been illustrated and described as having the respective ventilating passages 33, 33A, 33B and 33D on one side thereof, it is to be understood that such passages 33, 33A, 33B and 33D could be on both sides thereof by like structure or different structure as desired, such as is illustrated in FIG. 1 for the pulley 22, and in the case of the pulley 33D, the passages 33D from each side 34D and 35D thereof could be staggered relative to each other or could intersect each other, such as at the annular surface 52, as desired. Of course, a combination of passages 33D and passages 33, 33A and 33B could be provided for each pulley of this invention.

Also, if desired, air flow through the passage means of any of the pulleys of this invention could be augmented by mounting an external fan or blower adjacent thereto to additionally force air into the inlets of the passage means and, thus, through the passage means.

While the pulleys 22, 22A, 22B and 22C have been illustrated and described as having the inlets for the respective ventilating passages 33, 33A, 33B and 33D adjacent the respective hubs thereof while the outlets are respectively disposed adjacent the respective peripheral grooves thereof, it is to be understood that the fluid flow through the passages 33, 33A, 33B and 33D could occur in a reverse direction therethrough. For example, the pulley system could be mounted in a chamber that is supplied fluid under pressure while the hub of the pulley is vented to the atmosphere or to a chamber having a lower pressure so that the fluid will flow in opposition to the centrifugal force created by the rotating pulley from the outer periphery of the passages to the inner periphery thereof for the aforementioned cooling purposes. Therefore, while the terms "inlet" and "outlet" have been previously utilized in the specification and in the following claims to designate the openings of the passages respectively adjacent the hub and peripheral groove of the pulley, it is to be understood that the inlet for each passage means could be disposed adjacent the peripheral groove while the respective outlet thereof is disposed adjacent the hub whereby it is to be understood that in this description and in the following claims, the term "inlet" can be substituted for the word "outlet and the term "outlet" can be substituted for the word "inlet" for each of the passage means set forth herein.

It is also to be understood that through suitable shaping or directing of the outlets of the passage means of the pulleys of this invention, the fluid leaving such outlets of the passage means can be directed to directly engage against the belt of the respective pulley so as to further tend to cool the same. For example, suitable shrouding can be provided either integral with the pulley or separate therefrom for directing the flow from the outlets of the passages thereof directly against the belt operating with such pulley.

Therefore, it can be seen that this invention not only provides improved belt pulleys, but also this invention provides improved methods of making such belt pulleys.

While the forms and methods of this invention now preferred have been illustrated and described as required by the Patent Statute, it is to be understood that other forms and method steps can be utilized and still fall within the scope of the appended claims.

What is claimed is:

1. In a belt pulley having a hub and a peripheral groove for receiving part of an endless belt therein that is to drive said pulley or be driven thereby whereby said pulley is adapted to be rotated about the axis of said hub, said groove of said pulley defining an annular bottom surface of said groove and a pair of spaced apart angled inside surfaces of said groove that join with said bottom surface and diverge away from each other as said angled surfaces extend away from said bottom surface, said angled surfaces being adapted to be engaged by opposed angled sides of said belt in such a manner that a bottom of said belt will be spaced from said bottom surface, said pulley having opposed outer sides, said pulley having means defining at least one passage means provided with an inlet interrupting one of said opposed outer sides adajcent said hub and an outlet interrupting said bottom surface of said peripheral groove whereby fluid passing through said passage means from said inlet to said outlet thereof will tend to cool said pulley and said belt as said pulley rotates about said axis, the improvement wherein said passage means comprises at least one substantially straight bore connecting the inlet and outlet and having a centerline, said bore being arranged such that upon extension of said centerline through the outlet it will intersect one of said angled side surfaces in close proximity to said bottom surface.

2. A belt pulley as set forth in claim 1 wherein said passage means is substantially straight between said inlet and said outlet thereof.

3. A belt pulley as set forth in claim 2 wherein said means defining said passage means defines a plurality of like passage means that are substantially equally spaced apart circumferentially about said pulley.

4. A belt pulley as set forth in claim 1 wherein said passage means extends in a generally radially outwardly direction from said inlet thereof to said outlet thereof.

5. A belt pulley as set forth in claim 4 wherein said means defining said passage means defines a plurality of like passage means that are substantially equally spaced apart circumferentially about said pulley.

6. In a method of making a belt pulley having a hub and a peripheral groove for receiving part of an endless belt therein that is to drive said pulley or be driven thereby whereby said pulley is adapted to be rotated about the axis of said hub, said groove of said pulley defining an annular bottom surface of said groove and a pair of spaced apart angled inside surfaces of said groove that join with said bottom surface and diverge away from each other as said angled surfaces extend away from said bottom surface, said angled surfaces being adapted to be engaged by opposed angled sides of said belt in such a manner that a bottom of said belt will be spaced from said bottom surface, said pulley having opposed outer sides, said method comprising a step of forming said pulley with at least one passage means provided with an inlet interrupting one of said outer sides adjacent said hub and an outlet interrupting said bottom surface of said peripheral groove whereby fluid passing through said passage means from said inlet to said outlet thereof will tend to cool said pulley and said belt as said pulley rotates about said axis, the improvement wherein said step of forming said pulley with at least one passage means comprises a step of forming said passage means to comprise at least one substantially straight bore connecting the inlet and outlet and having a centerline, said bore being arranged such that upon extension of said centerline through the outlet it will intersect one of said angled side surfaces in close proximity to said bottom surface.

7. A method of making a belt pulley as set forth in claim 6 and including a step of forming said passage means to be substantially straight between said inlet and said outlet thereof.

8. A method of making a belt pulley as set forth in claim 7 and including a step of forming said pulley to have a plurality of said passage means that are substantially equally spaced apart circumferentially about said pulley.

9. A method of making a belt pulley as set forth in claim 6 and including a step of forming said passage means to extend in a generally radially outwardly direction from said inlet thereof to said outlet thereof.

10. A method of making a belt pulley as set forth in claim 9 and including a step of forming said pulley to have a plurality of said passage means that are substantially equally spaced apart circumferentially about said pulley.

* * * * *